United States Patent
Gotou

(10) Patent No.: US 9,415,511 B2
(45) Date of Patent: Aug. 16, 2016

(54) APPARATUS AND METHOD FOR PICKING UP ARTICLE RANDOMLY PILED USING ROBOT

(71) Applicant: FANUC Corporation, Yamanashi (JP)

(72) Inventor: Takefumi Gotou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 39 days.

(21) Appl. No.: 14/532,716

(22) Filed: Nov. 4, 2014

(65) Prior Publication Data

US 2015/0127162 A1 May 7, 2015

(30) Foreign Application Priority Data

Nov. 5, 2013 (JP) .................................. 2013-229591

(51) Int. Cl.
*B25J 9/16* (2006.01)

(52) U.S. Cl.
CPC .............. *B25J 9/1612* (2013.01); *B25J 9/1671* (2013.01); *B25J 9/1697* (2013.01); *G05B 2219/40053* (2013.01)

(58) Field of Classification Search
CPC ...... B25J 9/1612; B25J 9/1605; B25J 9/1656; B25J 9/1664; B25J 9/1669; B25J 9/1671; B25J 9/1697; B23P 19/007; B65G 47/905; G05B 2219/40053; G05B 2219/40504
See application file for complete search history.

(56) References Cited

U.S. PATENT DOCUMENTS

2014/0147240 A1  5/2014  Noda et al.

FOREIGN PATENT DOCUMENTS

| | | |
|---|---|---|
| CN | 101034418 A | 9/2007 |
| CN | 103085076 A | 5/2013 |
| CN | 103302664 A | 9/2013 |
| DE | 112011103794 T5 | 10/2013 |
| JP | 10-156775 A | 6/1998 |
| JP | 2004-295223 A | 10/2004 |
| JP | 2007-241857 A | 9/2007 |
| JP | 2011-093058 A | 5/2011 |
| JP | 2011-179909 A | 9/2011 |
| JP | 2013-52490 A | 3/2013 |
| JP | 2013-101045 A | 5/2013 |
| WO | 2013/002099 A1 | 1/2013 |

*Primary Examiner* — Spencer Patton

(74) *Attorney, Agent, or Firm* — Hauptman Ham, LLP

(57) ABSTRACT

An article pickup apparatus configured so as to set a grip unit model including a substantial region of the grip unit in an opened state and a grip region inside the substantial region, set position posture candidates of the grip unit, calculate a grip success possibility of any of the articles by the grip unit in each of the grip position posture candidates based on the position information acquired by a three-dimensional measurement instrument and the grip unit model, select position posture candidates from the position posture candidates based on the grip success possibility and setting the selected position posture candidates as grip unit position postures, and control the robot so as to move the grip unit to the grip unit position postures to pick up any of the articles.

11 Claims, 13 Drawing Sheets

FIG. 1
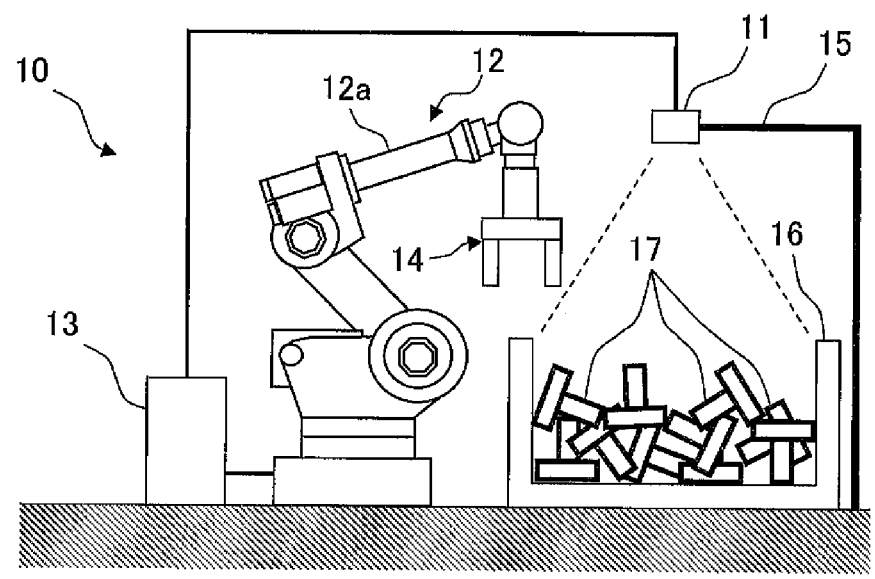
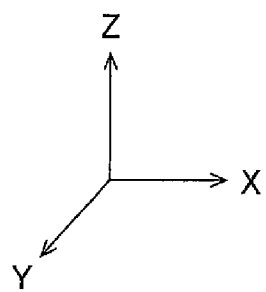

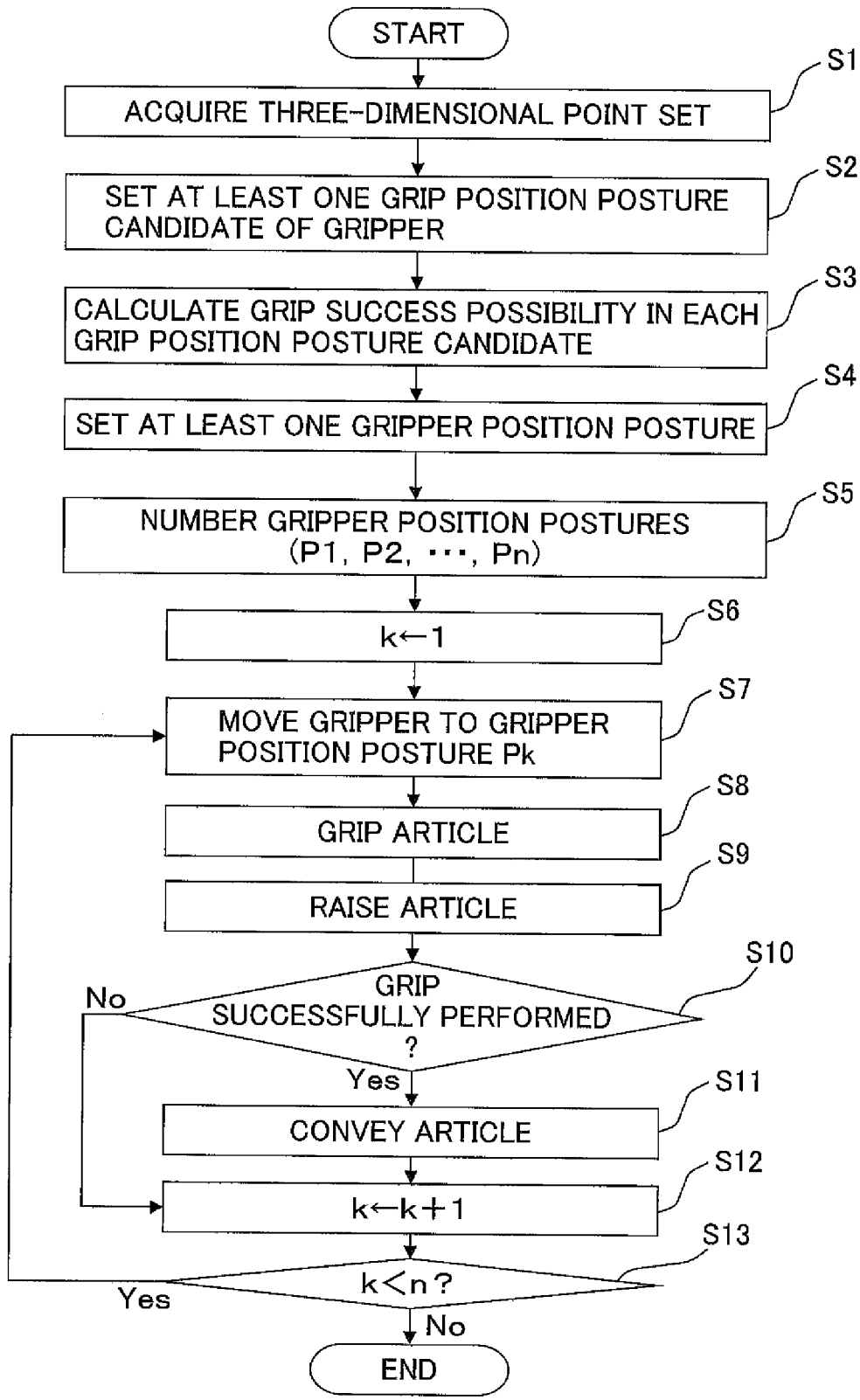

APPARATUS AND METHOD FOR PICKING UP ARTICLE RANDOMLY PILED USING ROBOT

BACKGROUND OF THE INVENTION

1. Field of the Invention

The present invention relates to an article pickup apparatus and an article pickup method for picking up an article randomly piled in a three-dimensional space using a robot including a grip unit.

2. Description of the Related Art

As an apparatus of this type, conventionally, there is known an apparatus configured to recognize a position of an article by applying three-dimensional matching processing to a three-dimensional point set obtained by measuring articles randomly piled using a three-dimensional measurement instrument. This apparatus is described, for example, in Japanese Laid-open Patent Publication No. 2011-179909 (JP2011-179909A). Further, an apparatus configured to measure articles randomly piled using a three-dimensional measurement instrument and then extract a region able to be gripped by a grip unit is also known. This apparatus is described, for example, in Japanese Laid-open Patent Publication No. 2011-093058 (JP2011-093058A).

In the apparatus described in JP2011-179909A, while a three-dimensional model pattern of an article is previously acquired from a CAD model or the like, surfaces of articles in a three-dimensional space are measured using a three-dimensional measurement instrument and a three-dimensional point set (an distance image) is acquired, and then the three-dimensional point set is divided into partial regions surrounded by an edge extracted from the three-dimensional point set. Then, initially, one of the partial regions is set as an article region, and both matching processing of the three-dimensional model pattern for the article region and update processing for adding another partial region to the article region are repeated to measure positions and postures of the articles.

In the apparatus described in JP2011-093058A, a grip region including a grip mechanism region determined by a grip mechanism and a grip portion region determined by a grip portion of a target gripped by the grip mechanism is previously stored, and a region equal in size to the grip region and a region where an article is present in the entire region equal in size to the grip portion region but the article is not present in a region equal in size to the grip mechanism region is extracted as a grippable region.

However, in the apparatus described in JP2011-179909A, it is necessary to previously prepare a three-dimensional model pattern for each type of article, and therefore, time and effort are needed. In particular, regarding a large number of types of articles, it is necessary to prepare model patterns for the number of types and therefore, much time and effort are needed. Further, for an indefinitely shaped article, it is inherently difficult to prepare a model pattern, resulting in difficulty in an application thereof. Further, when a grip unit is moved to a pickup position determined by a position posture of an article, a collision between another article and the grip unit may occur.

Further, in the apparatus described in JP2011-093058A, it is necessary to previously set a grip portion region of an article. In addition, there occurs a case where the grip portion region is not exposed on a three-dimensional measurement instrument side in some positions and postures of the article and in this case, it is difficult to pick up the article.

SUMMARY OF THE INVENTION

An article pickup apparatus according to an aspect of the present invention includes: a robot including a grip unit provided in an openable and closable manner; a three-dimensional measurement instrument measuring surface positions of a plurality of articles randomly piled on a three-dimensional space to acquire position information of a plurality of three-dimensional points; a grip unit model setting unit setting a grip unit model including a substantial region and a grip region inside the substantial region, the substantial region being a region of a substantial portion of the grip unit in an opened state; a position posture candidate setting unit setting one or more position posture candidates as a candidate of a position and a posture of the grip unit; a gripability calculation unit calculating a grip success possibility of any of the articles by the grip unit in each of the grip position posture candidates, assuming that the grip unit is placed at the grip position posture candidates set by the position posture candidate setting unit, based on the position information acquired by the three-dimensional measurement instrument and the grip unit model set by the grip unit model setting unit; a position posture setting unit selecting one or more position posture candidates from the position posture candidates set by the position posture candidate setting unit based on the grip success possibility calculated by the gripability calculation unit, and setting as a grip unit position posture; and a robot control unit controlling the robot so as to move the grip unit to the grip unit position posture set by the position posture setting unit to pick up any of the articles.

Another aspect of the present invention is an article pickup method for picking up any of articles randomly piled on a three-dimensional space using a robot including a grip unit provided in an openable and closable manner, the method includes: measuring surface positions of a plurality of the articles to acquire position information of a plurality of three-dimensional points; setting a grip unit model including a substantial region and a grip region inside the substantial region, the substantial region being a region of a substantial portion of the grip unit in an opened state; setting one or more position posture candidates as a candidate of a position and a posture of the grip unit; calculating a grip success possibility of any of the articles by the grip unit in each of the grip position posture candidates, assuming that the grip unit is placed at the grip position posture candidates, based on the position information acquired by the three-dimensional measurement instrument and the grip unit model; selecting one or more position posture candidates from the position posture candidates based on the grip success possibility, and setting as a grip unit position posture; and controlling the robot so as to move the grip unit to the grip unit position posture to pick up any of the articles.

BRIEF DESCRIPTION OF THE DRAWINGS

Objects, features, and advantages of the present invention will become further apparent from the following description of an embodiment when taken with the accompanying drawings in which:

FIG. 1 is a view illustrating a schematic configuration of an article pickup apparatus according to one embodiment of the present invention;

FIG. 4 is a flowchart illustrating one example of processing executed in a robot control device of FIG. 1;

DETAILED DESCRIPTION

Figure 2:
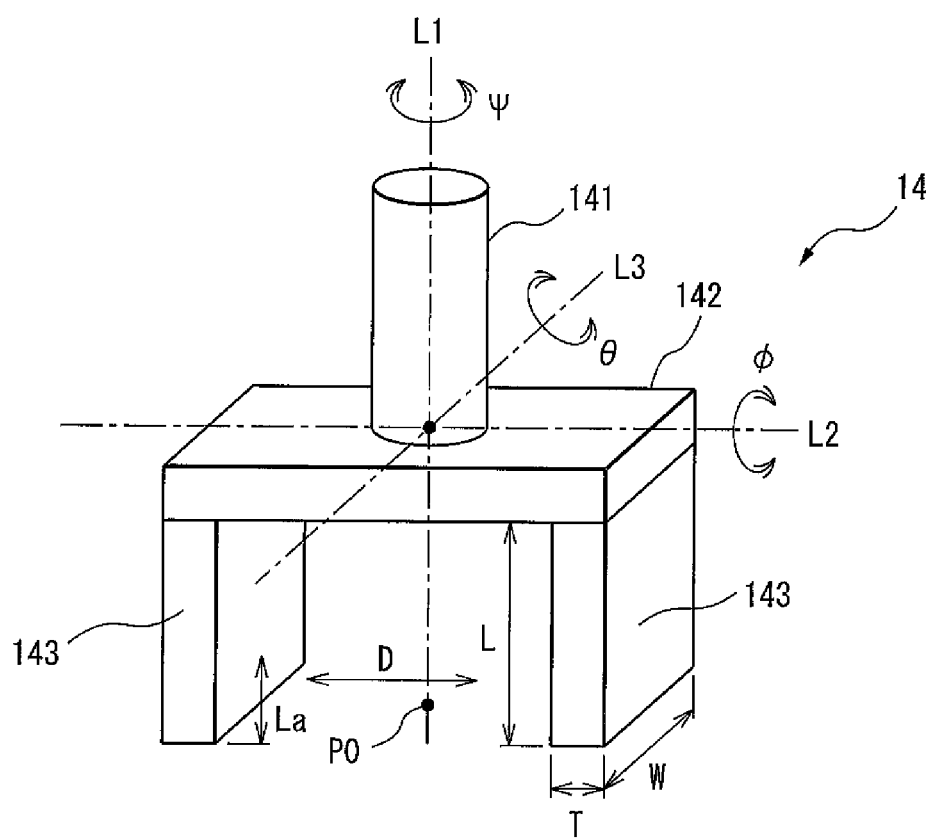
FIG. 2 is a perspective view illustrating a schematic configuration of a gripper of FIG. 1.

Hereinafter, with reference to FIG. 1 to FIG. 18, an article pickup apparatus according to the embodiment of the present invention will be described. FIG. 1 is a view illustrating a schematic configuration of an article pickup apparatus 10 according to one embodiment of the present invention. The article pickup apparatus 10 includes a three-dimensional measurement instrument 11, a robot 12, and a robot control device 13 for controlling the three-dimensional measurement instrument 11 and the robot 12 by being connected to the three-dimensional measurement instrument 11 and the robot 12. The robot 12 includes a gripper 14 mounted on a tip of an arm 12a. A container 16 is disposed sideward of the robot 12. Together therewith, FIG. 1 illustrates an orthogonal three-axis coordinate system of X, Y, and Z. The Z-direction is a vertical direction, and the X-direction and the Y-direction are horizontal directions. The container 16 is illustrated on an XZ plane.

In the container 16 opened upward, a plurality of articles 17 are randomly piled. The article pickup apparatus 10 of the present embodiment determines a position and a posture (a position posture) of the gripper 14 capable of gripping the article 17 and controls the robot 12 to move the gripper 14 to the determined position posture. Further, with this position posture, the gripper 14 grips the article 17 and then picks up the article 17 from the container 16 by an operation of the robot 12 to convey the article 17 to a predetermined position outside the container 16. FIG. 1 illustrates a plurality of articles 17 as the same shape as each other, but indefinitely shaped articles and a plurality of types of articles are employable.

The three-dimensional measurement instrument 11 is disposed above a center portion of the container 16 and measures a surface of an exposed article 17 among articles 17 randomly piled in the container 16 to acquire position information (three-dimensional information) of a plurality of three-dimensional points. A measurement range of the three-dimensional measurement instrument 11 needs to include the container 16 but an excessively large measurement range decreases measurement resolution. Therefore, preferably, the measurement range is equivalent to an occupied range of the container 16 and, for example, accords with the occupied range of the container 16. In FIG. 1, the three-dimensional measurement instrument 11 is fixed to a dedicated cradle 15 but may be mounted on a tip of the robot 12. The three-dimensional measurement instrument 11 and the robot control device 13 are connected to each other via a communication unit such as a communication cable so as to be communicable with each other.

As the three-dimensional measurement instrument 11, various non-contact types are can be used. There are cited, for example, a stereoscopic type using two cameras, a scanning type using laser slit light, a scanning type using laser spot light, a type of projecting pattern light on an article using a device such as a projector, and a type of utilizing a flight time from emission of light from a projector to incidence to a light receiver via reflection on an article surface.

The three-dimensional measurement instrument 11 expresses the acquired three-dimensional information as the format of a distance image or a three-dimensional map. The distance image is an image where three-dimensional information is expressed as an image format, and expresses a height of a position on an image or a distance from the three-dimensional measurement instrument 11 using brightness or a color of each pixel of the image. On the other hand, the three-dimensional map is a map where three-dimensional information is expressed as a set of measured three-dimensional coordinate values (x, y, z). In the present embodiment, each pixel in a distance image or a point having three-dimensional coordinate values in a three-dimensional map is referred to as a three-dimensional point, and a set including a plurality of three-dimensional points is referred to as a three-dimensional point set. The three-dimensional point set is a set of all the three-dimensional points measured using the three-dimensional measurement instrument 11 and can be acquired using the three-dimensional measurement instrument 11.

FIG. 2 is a perspective view illustrating a schematic configuration of the gripper 14. The gripper 14 includes a shaft unit 141 fixed to a tip of the robot arm 12a, a plate unit 142 disposed in a lower end portion of the shaft unit 141, and a pair of grip nails 143 disposed on both end portions of the plate unit 142. The shaft unit 141 extends along an axis line L1 passing through the center thereof, and the plate unit 142 extends along an axis line L2 vertical to the axis line L1. The paired grip nails 143 each have a length L parallel to the axis line L1, a thickness T parallel to the axis line L2, and a width W parallel to an axis line line L3 vertical to each of the axis line L1 and the axis line L2; and are symmetrically shaped with respect to the axis line L1. The grip nail 143 is movable parallel to the axis line L2 along a lower surface of the plate unit 142 and thereby, a distance D between one nail and the other nail of the paired grip nails 143 is changed. A length from a tip of the grip nail 143 necessary for the pair of grip nails 143 to grip the article 17 where the length is parallel to the axis line L1 is designated as a grip depth La.

In the figure, when a point located downward from a point where the axis lines L1, L2, and line L3 intersect by a predetermined distance, for example, a point P0 where the axis line L1 and a bottom of the grip nail 143 intersect is designated as a reference point of the gripper 14, a position of the gripper 14 is determined by position coordinates (x, y, z) of the reference point P0. When a posture where the axis line L1 and the Z-axis, the axis line L2 and the X-axis, and the axis line L3 and the Y-axis (FIG. 1) are parallel to each other, respectively, is designated as a reference posture of the gripper 14, the gripper 14 is rotatable from the reference posture by a predetermined angle ψ (for example, −90°≤ψ≤90°) around the axis line L1, is rotatable by a predetermined angle φ (for example, −30°≤φ≤30°) around the axis line L2, and is rotatable by a predetermined angle θ (for example, −30°≤θ≤30°) around the axis line L3. Therefore, the angles φ, θ, and ψ determine a posture of the gripper 14. In other words, a position posture of the gripper 14 in a three-dimensional space is determined by six degrees of freedom of six directions (x, y, z, φ, θ, and ψ) including translation three directions (x, y, z) and rotation three directions (φ, θ, ψ).

Figure 3A:
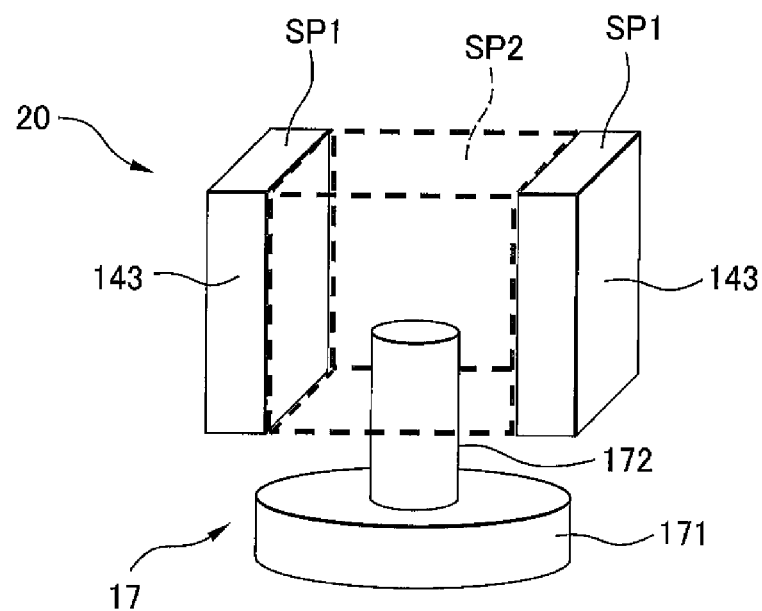
FIG. 3A is a view schematically illustrating an operation of the gripper of FIG. 1.
Figure 3B:
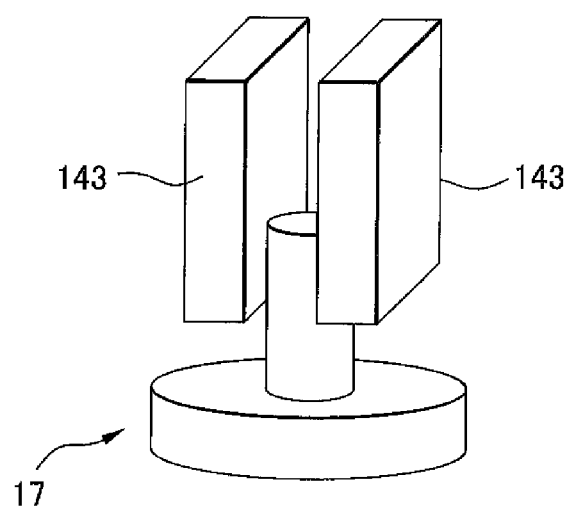
FIG. 3B is a view schematically illustrating an operation following the operation in FIG. 3A.

FIG. 3A and FIG. 3B each are a view schematically illustrating an operation of the grip nail 143 of the gripper 14. The article 17 includes, as one example, a disc portion 171 and a cylindrical portion 172 vertically disposed from a center portion of the disc portion 171. When gripping the article 17, for example, as illustrated in FIG. 3A, while the grip nail 143 is opened, a pair of grip nails 143 is disposed so that respective grip nails are located on both sides of the article (cylindrical portion 172). From this state, as illustrated in FIG. 3B, the paired grip nails 143 are caused to be close to each other to grip the article 17 using the paired grip nails 143. When the article 17 is disposed upside down, the grip nail 143 can grip the disc portion 171.

In the present embodiment, the grip nail 143 being opened as illustrated in FIG. 3A is previously set in the robot control device 13 as a gripper model 20. The gripper model 20 includes a substantial region SP1 which is a region of a substantial portion where a pair of grip nails 143 exists and a grip region SP2 which is located inside the substantial region SP1. When a position posture of the gripper 14 being opened is controlled so that the article 17 is disposed in the grip region SP2, the article 17 becomes able to be gripped.

FIG. 4 is a flowchart illustrating processing executed in the robot control device 13, and specifically illustrating one example of processing for article pickup. An operation of the article pickup apparatus 10 will be described with reference to the flowchart of FIG. 4 and the drawings associated therewith.

Processing of FIG. 4 is started when, for example, a pickup start command of an article 17 is input by operating an operation switch not illustrated.

Figure 5:
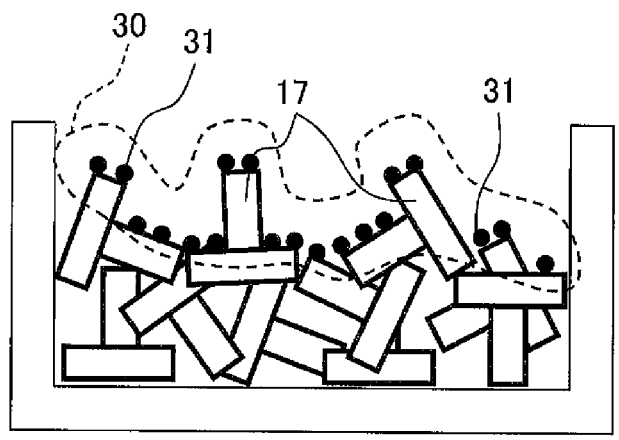
FIG. 5 is a view illustrating one example of a three-dimensional point set acquired using a three-dimensional measurement instrument of FIG. 1.

Initially, step S1 measures surfaces of a plurality of articles 17 randomly piled in a three-dimensional space using the three-dimensional measurement instrument 11 and then acquires a three-dimensional point set 30. FIG. 5 is a view illustrating one example of the three-dimensional point set 30 acquired using the three-dimensional measurement instrument 11 and three-dimensional points 31 configuring the three-dimensional point set 30. In the figure, the three-dimensional points 31 are illustrated with black circles and the three-dimensional point set 30 is illustrated as a region surrounded by a dotted line including all the black circles.

Then, step S2 sets at least one grip position posture candidate which is a candidate of a position posture of the gripper 14 in a three-dimensional space. The grip position posture candidate is expressed by six degrees of freedom, i.e., position coordinates (x, y, z) and angles (φ, θ, ψ), indicating a position posture of the gripper 14, and of six degrees of freedom (x, y, z, φ, θ, ψ), at least one degree of freedom is set as a parameter.

When, for example, x is set as a parameter (x1, x2, ...) and y, z, φ, θ, and ψ are set as fixed values (y0, z0, φ0, θ0, and ψ0), initially, a range (search range) Δx able to be provided for x is set. The search range Δx can be provided using a minimum value xmin and a maximum value xmax of x-coordinates of three-dimensional points 31 belonging to the three-dimensional point set 30 (xmin≤x≤xmax). The search range Δx may be previously set in the robot control device 13. Then, a pitch (search interval) px of the x-direction of a grip position posture candidate is set. The search interval px may be previously set or may be determined by dividing the range Δx by a predetermined number. Thereby, grip position posture candidates (x1, y0, z0, φ0, θ0, ψ0), (x2, y0, z0, φ0, θ0, ψ0), ... are set in the x-direction at equal intervals.

When any of y, z, φ, θ, and ψ is set as a parameter, the same manner as described above is employed. However, search ranges of φ, θ, and ψ may be set as ranges able to be provided for the gripper itself, i.e., −30°≤φ≤30°, −30°θ≤30°, and −90°≤ψ≤90°, respectively. When of six degrees of freedom, a plurality of degrees of freedom (for example, x and y) are set as parameters, grip position posture candidates are provided by combining grip position posture candidates where x is set as a parameter and grip position posture candidates where y is set as a parameter. When, for example, there are five grip position posture candidates where x is set as a parameter and four grip position posture candidates where y is set as a parameter, grip position posture candidates total 5×4=20. When x and y are set as parameters and z is set as a fixed value, z satisfying a predetermined condition may be selected from measured three-dimensional points 31. For example, among three-dimensional points 31 present within a predetermined distance from (x, y), a z-coordinate of a three-dimensional point 31 located at the highest position may be designated as a z-coordinate of a grip position posture candidate.

Step S3 calculates a possibility of succeeding in gripping the article 17, i.e., a grip success possibility E, on an assumption that the gripper 14 is placed in each grip position posture candidate set in step S2. The grip success possibility E is calculated, for example, in a range of 0 to 1.0 based on position information of three-dimensional points 31 and a preset gripper model 20, and a larger numerical value means a higher possibility capable of gripping the article 17. The grip success possibility E is calculable using the following equation (I), based on a gravity center position of all the three-dimensional points 31 present in the grip region SP2, for example.

$$E = 1.0 - \frac{|\vec{p} - \vec{g}|}{D1} \quad (I)$$

Figure 6:
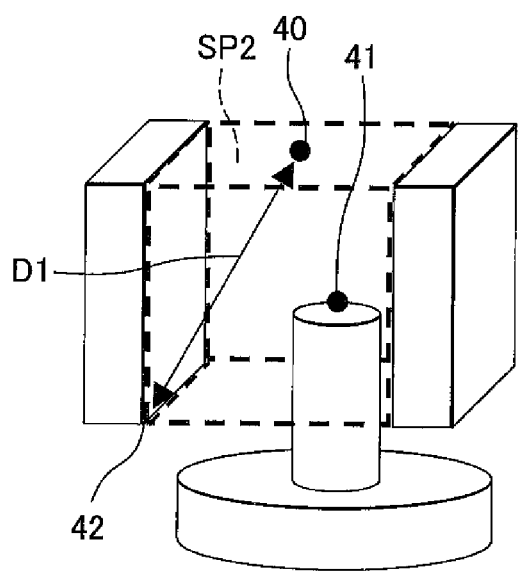
FIG. 6 is a view illustrating a calculation equation of grip success possibility.

A vector p of the above equation (I) is a vector up to a center position 40 of an upper surface of the grip region SP2, and a vector g is a vector up to a gravity center position 41 of three-dimensional points 31 present in the grip region SP2, as illustrated in FIG. 6. D1 is a distance from the center position 40 of the upper surface of the grip region SP2 to a most distant point 42 in the grip region SP2. According to the above equation (I), as the gravity center position 41 of three-dimensional points 31 is close to the center position 40 of the upper surface of the grip region SP2, the grip success possibility E increases. In other words, in this case, a length of a portion for gripping the article 17 increases and also a pair of grip nails 143 can grip the article 17 evenly from both sides thereof and therefore, the grip success possibility E increases.

When the grip success possibility E is calculated, it is possible to determine a distance D1 between the gravity center position 41 of three-dimensional points 31 present in the grip region SP2 and the upper surface of the grip region SP2 ith respect to each of the X-, Y-, and Z-axes to calculate E. The grip success possibility E is also calculable using a Manhattan distance instead of a Euclidean distance. The grip success possibility E is also calculable using the following equation (II) based on a distribution of three-dimensional points 31 present in the grip region SP2.

$$E = 1.0 - \frac{\sum_{i=1}^{N} |zi - z0|}{N \cdot D2} \quad \text{(II)}$$

Figure 7A:
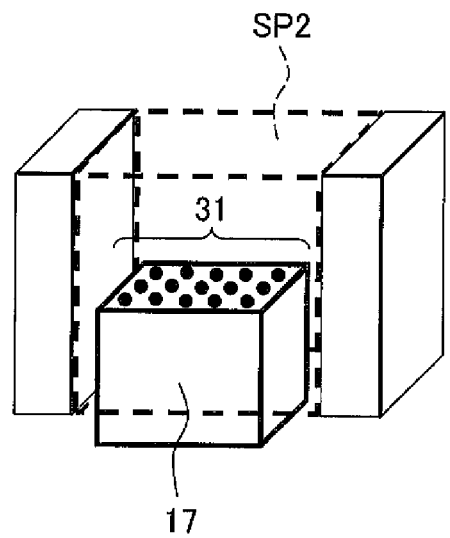
FIG. 7A is a view illustrating one posture of an article disposed in a grip region of a gripper model.
Figure 7B:
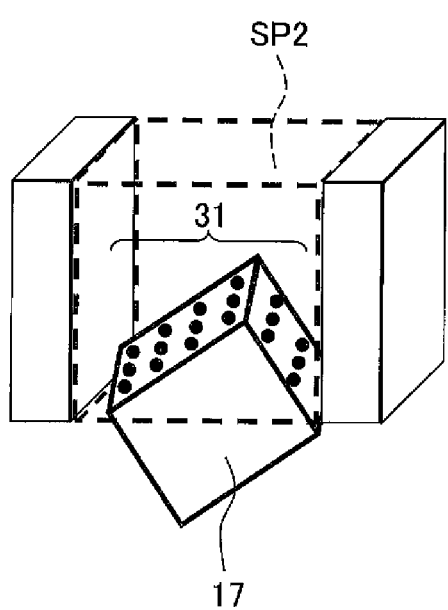
FIG. 7B is a view illustrating another posture of an article disposed in the grip region of the gripper model.

In the above equation (II), N represents the number of three-dimensional points 31 present in the grip region SP2, z0 represents a z-coordinate of a gravity center of all the three-dimensional points 31 in the grip region SP2, z1 represents a z-coordinate of an ith three-dimensional point 31 present in the grip region SP2, and D2 represents a height (a length of the Z-direction) of the grip region SP2. The above equation (II) takes it into consideration that when an upper surface of the article 17 present in the grip region SP2 is flat, the article 17 is easily gripped, and according to the above equation (II), when the upper surface of the article 17 is flatter, the grip success possibility E increases. For example, the state of FIG. 7A is higher than the state of FIG. 7B in the grip success possibility E. In the above equation (II), a variance value of z-coordinates is also usable, and the grip success possibility E may be calculated based on a distribution other than z-coordinates (for example, x-coordinates or y-coordinates).

From a sum (E1+E2) of a grip success possibility (expressed by E1) determined by the above equation (I) and a grip success possibility (expressed by E2) determined by the above equation (II), the grip success possibility E may also be calculated, or from a sum obtained using a plurality of other evaluation equations, the grip success possibility E may also be calculated. In this case, it is possible that weighting coefficients are previously set and then each evaluation equation is multiplied by a corresponding predetermined weighting coefficient to calculate the grip success possibility E.

When calculating the grip success possibility E, it is possible to judge whether three-dimensional points 31 are present in the substantial region SP1 nd then to set the grip success possibility E to be 0 when any one of the three-dimensional points 31 exists. Thereby, when the gripper 14 grips the article 17, the gripper (the grip nail 143) can be prevented from colliding with another article 17. Therefore, a possibility of failing to grip the article 17 is reduced and breakage of the article 17 and the gripper 14 becomes preventable.

Figure 8:
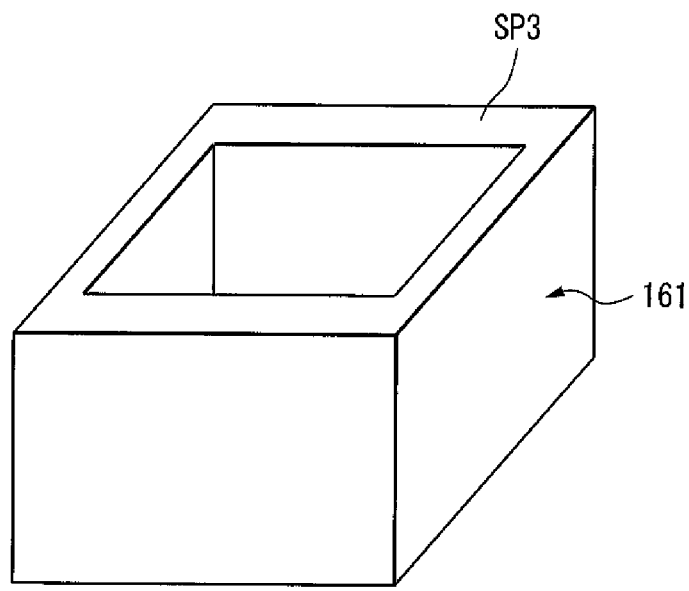
FIG. 8 is a view where a container of FIG. 1 is modeled.

When a model (a container model) of the container 16 is previously set in the robot control device 13 and the grip success possibility E is calculated, it is possible to judge the presence or absence of a collision between the gripper 14 and the container 16 using the container model. FIG. 8 is a view illustrating one example of a container model 161. As illustrated in FIG. 8, the container model 161 includes a substantial region SP3 which is a region of a substantial portion where the container 16 exists. It is possible to set the grip success possibility E to be 0 when the substantial region SP3 of the container 16 is present in the substantial region SP1 of the gripper 14 with respect to each position posture candidate. Thereby, when the gripper 14 grips the article 17, the gripper 14 can be prevented from colliding with the container 16 and breakage of the gripper 14 and the container 16 becomes preventable.

Step S4 selects at least one grip position posture candidate from the grip position posture candidates set in step S2 based on the grip success possibility E calculated in step S3 and sets the selected candidate as a grip position posture (a gripper position posture) of the gripper 14. For example, a grip position posture candidate where the grip success possibility E is maximized is selected and set it as the gripper position posture. It is possible that in a three-dimensional space or a predetermined two-dimensional plane, a grip position posture candidate where the grip success possibility E is locally maximized is selected and set it as the gripper position posture.

Figure 9:
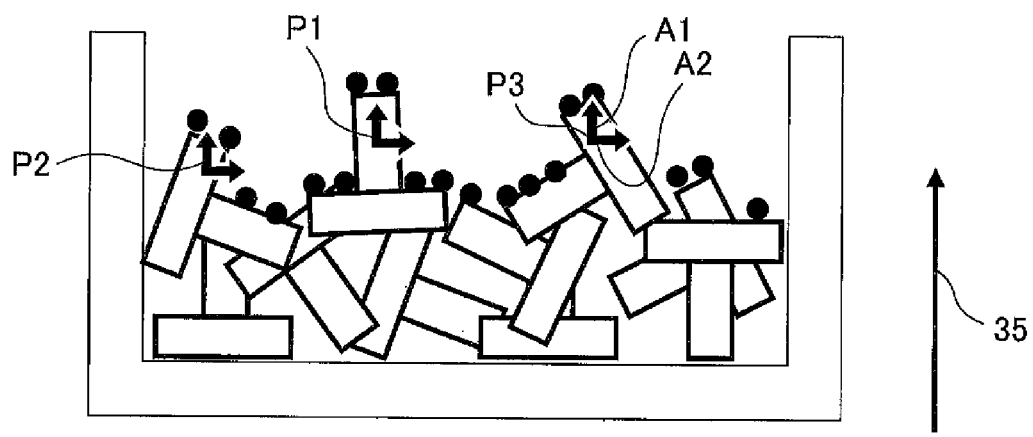
FIG. 9 is a view illustrating one example of a gripper position posture.

Step S5 numbers respective gripper position postures as P1, P2, . . . , Pn. N represents the number of gripper position postures. FIG. 9 is a view illustrating numbered gripper position postures, and numbering is performed in descending order of a coordinate value with respect to a predetermined coordinate axis 35, i.e., in order from one located in a higher position (a larger z-coordinate). In FIG. 9, n=3. Numbering may be performed in order from one having a larger grip success possibility E, instead of descending order of a coordinate value.

FIG. 9 illustrates gripper position postures P1, P2, and P3 using a pair of arrows A1 and A2 for each; and an intersection of the pair of arrows A1 and A2 indicates a position of a gripper position posture and directions of the arrows A1 and A2 indicate a posture of the gripper position posture. The position of the gripper position posture is, for example, a point (a reference point P0) where the axis line L1 of the gripper 14 of FIG. 2 and the bottom of the grip nail 143 intersect. Further, the posture (the directions of the arrows A1 and A2) of the gripper position posture indicates directions parallel to the axis lines L1 and line L2 of the gripper 14 of FIG. 2. The gripper position posture is expressed in a three-dimensional space and therefore, a direction of the axis line L3 is also defined in the gripper position posture.

In step S6, an initial value is provided for a variable k having a natural number value. In other words, processing for k←1 is executed. The variable k is used for specifying the number of a gripper position posture Pk.

Figure 10:
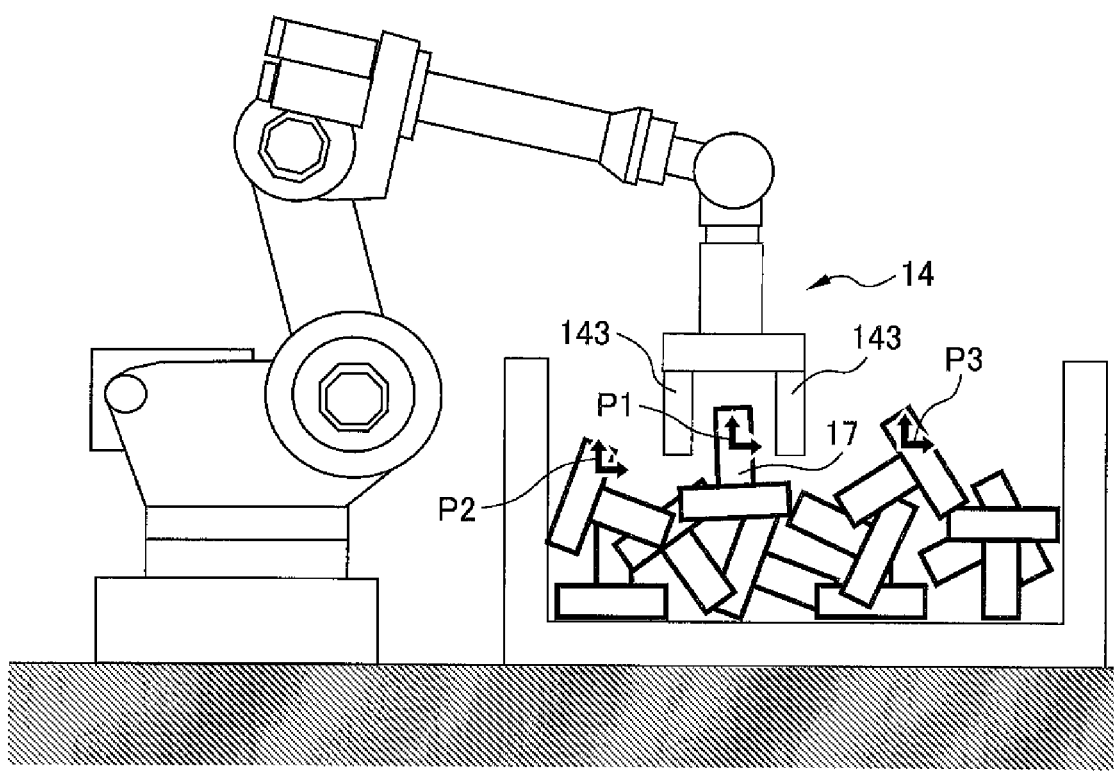
FIG. 10 is a view illustrating one example of an operation of the article pickup apparatus according to the embodiment of the present invention.

Step S7 outputs a control signal to a robot driving actuator (an electric motor) and moves the gripper 14 to the gripper position posture Pk (for example, P1) as illustrated in FIG. 10. Thereby, a pair of grip nails 143 is disposed on both sides of an article 17 to be picked up so as to nip the article 17.

Figure 11:
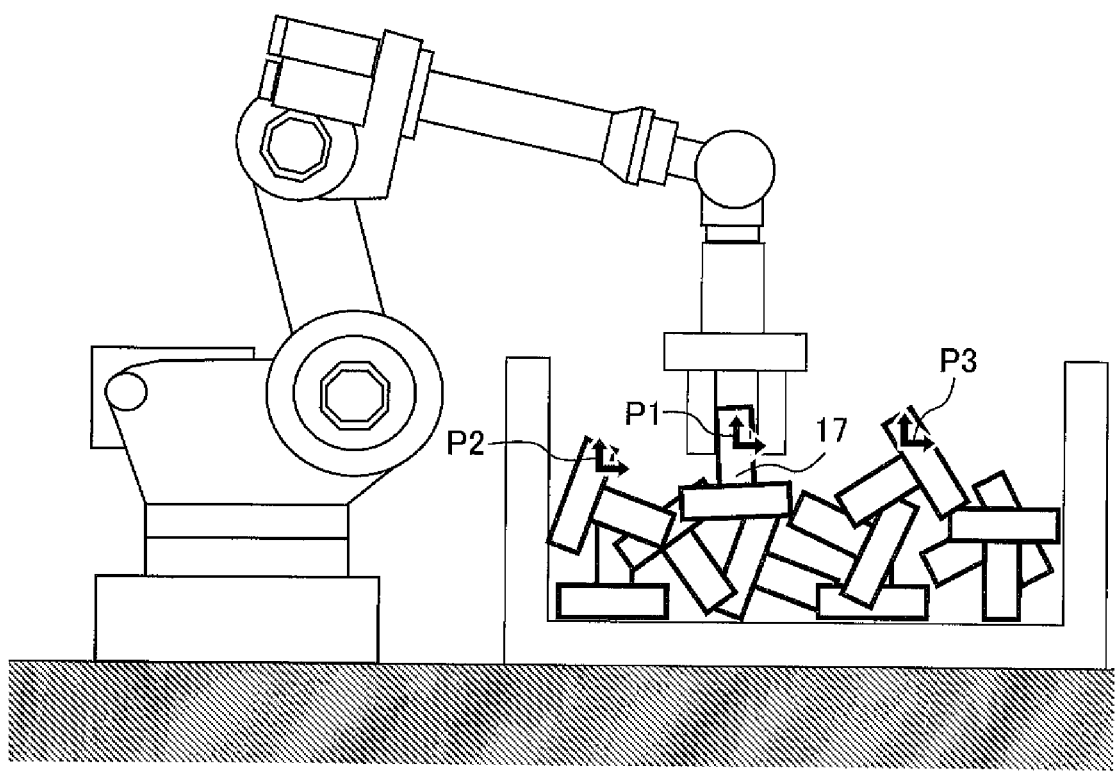
FIG. 11 is a view illustrating one example of an operation following the operation in FIG. 10.

Step S8 outputs a control signal for gripping the article 17 to a gripper driving actuator. Thereby, as illustrated in FIG. 11, the grip nail 143 grips the article 17. The gripper position posture Pk is obtained via numbering in descending order with respect to the predetermined coordinate axis 35 (step S5) and therefore, the article 17 to be picked up becomes an article 17 located in the highest position in the container 16, whereby a possibility that the gripper 14 collides with the article 17 during movement of the gripper 14 can be reduced. When numbering is performed in order from one having a larger grip success possibility E, a pickup is performed from an article 17 having a higher possibility of being gripped and therefore, a change in a loading state of the article 17 due to load shifting or the like of the article 17 can be inhibited.

Figure 12:
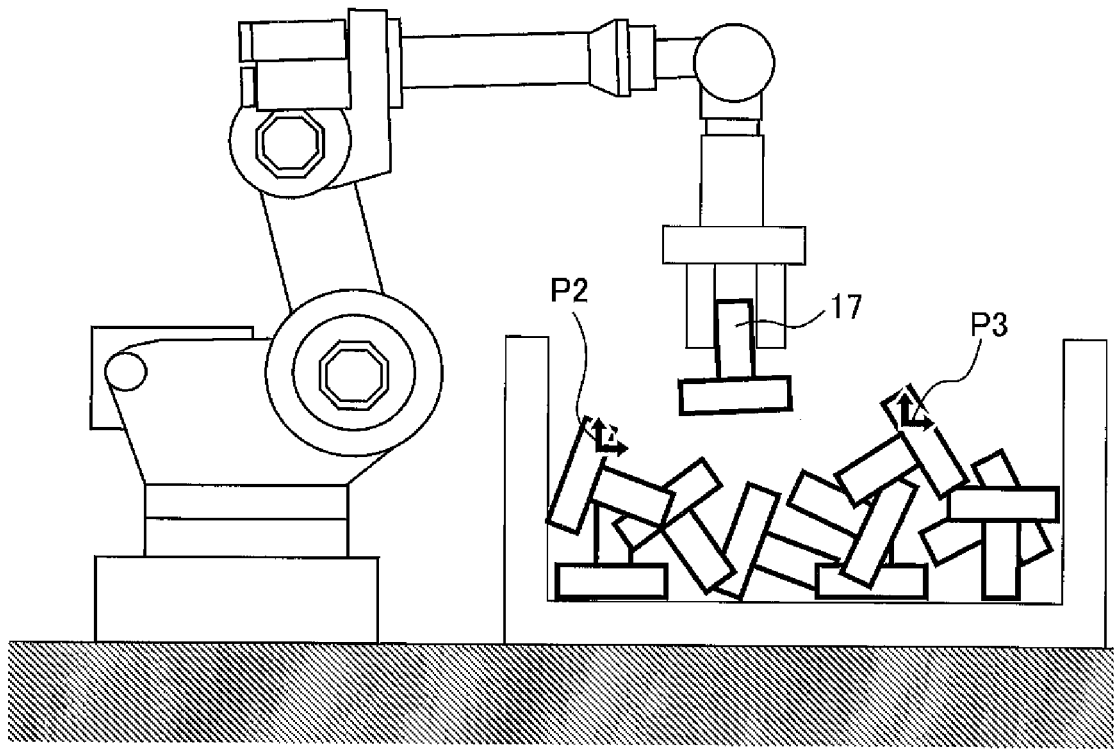
FIG. 12 is a view illustrating one example of an operation following the operation in FIG. 11.

Then, step S9 outputs a control signal to the robot driving actuator to raise the gripper 14, while gripping the article 17, to a predetermined direction, for example, in a direction of the predetermined coordinate axis 35 (FIG. 9) by a predetermined amount, as illustrated in FIG. 12.

Step S10 judges whether the gripper 14 has succeeded in gripping the article 17 in the raised position of the article 17. When, for example, the gripper 14 includes a weight detector for detecting weight and a detected value is at least a predetermined value, it is judged that a grip has been successfully performed. It is possible that a proximity sensor judges whether the article 17 exists to judge whether the grip has been successfully performed. It is possible that a switch is disposed on a tip of the gripper 14 to judge whether the grip has been successfully performed by ON and OFF of the switch. When it is judged that the grip has been successfully performed, the processing moves to step S11, but when it is judged that the grip has not been successfully performed, the processing passes step S11 and moves to step S12.

Step S11 outputs a control signal to the robot driving actuator and conveys the article 17 to a predetermined position by an operation of the robot 12 to remove the article 17 from the gripper 14.

Step S12 adds 1 to k for processing for k←k+1 and further step S13 judges whether k<n is satisfied. This judgment is a judgment whether any gripper position posture where the gripper 14 has not reached yet exists among n (3 in FIG. 9) gripper position postures Pk. A judgment of k<n indicates that the gripper 14 has not reached yet the gripper position posture Pk and therefore, processing returns to step S7. Then, the gripper 14 is moved to the next gripper position posture Pk (for example, P2) to grip the article 17. A judgment of k≥n in step S13 indicates that the gripper 14 has reached all n gripper position postures Pk and therefore, the processing is ended.

Figure 13:
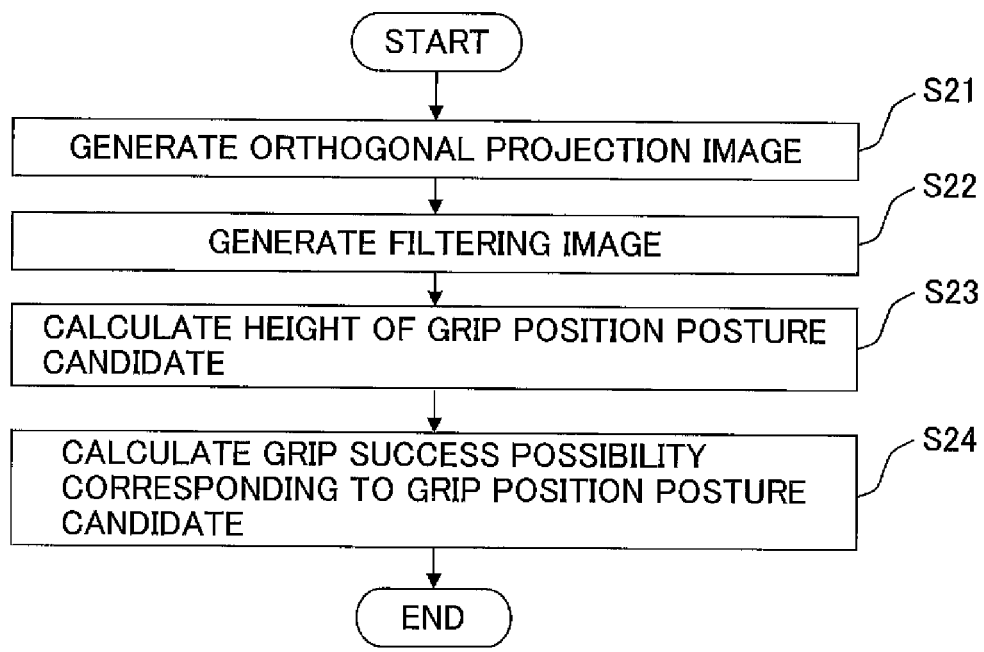
FIG. 13 is a flowchart illustrating a modified example of step S2 and step S3 of FIG. 4.

In the above processings, step S2 sets grip position posture candidates and step S3 calculates the grip success possibility E in each grip position posture candidate. However, these processings are executable, for example, as follows. FIG. 13 is a flowchart illustrating a modified example of step S2 and step S3 of FIG. 4.

Figure 14:
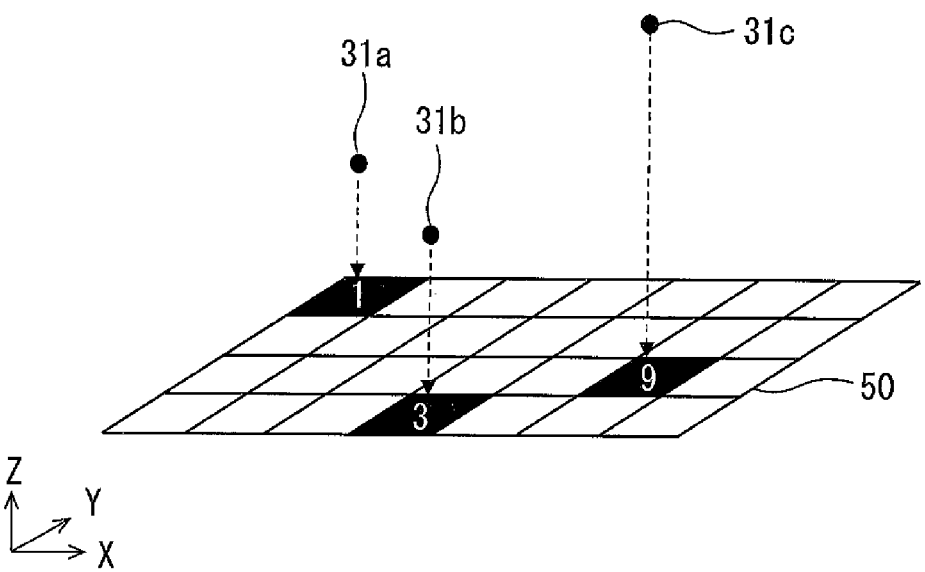
FIG. 14 is a view illustrating one example of an orthogonal projection image obtained by orthogonally projecting, in a predetermined direction, three-dimensional points acquired using a three-dimensional measurement instrument.

Initially, step S21 projects (orthogonally projects) three-dimensional points 31 acquired using the three-dimensional measurement instrument 11 in a predetermined direction and generates a projected plane (referred to as an orthogonal projection image). FIG. 14 is a view illustrating one example of an orthogonal projection image 50. The orthogonal projection direction refers to an approach direction (for example, −Z-direction) of the gripper 14 when gripping the article 17 using the gripper 14. In FIG. 14, three-dimensional points 31a, 31b, and 31c each are projected on the orthogonal projection image 50 parallel to an X-Y plane.

Pixels corresponding to the respective three-dimensional points 31a, 31b, and 31c of the orthogonal projection image 50 have pixel values equivalent to z-coordinates of the three-dimensional points 31a, 31b, and 31c ("1", "3", and "9" in FIG. 14), respectively. A size (lengths of the x- and y-directions) of a pixel of the orthogonal projection image 50 is previously set. It is also possible to set a size of a pixel so that the number of pixels of the image 50 becomes a predetermined value. Regarding a posture of a grip position posture candidate, a rotation angle ϕ around the x-axis and a rotation angle θ around the y-axis are set as a fixed value (for example, 0) and then a rotation angle ψ around the z-axis is set as a parameter. Therefore, when the rotation angle ψ is changed at a predetermined number of times in a predetermined angle pitch in each pixel, a total number of grip position posture candidates becomes (the number of pixels of the orthogonal projection image 50)×(the number of changes of ψ).

Figure 15:
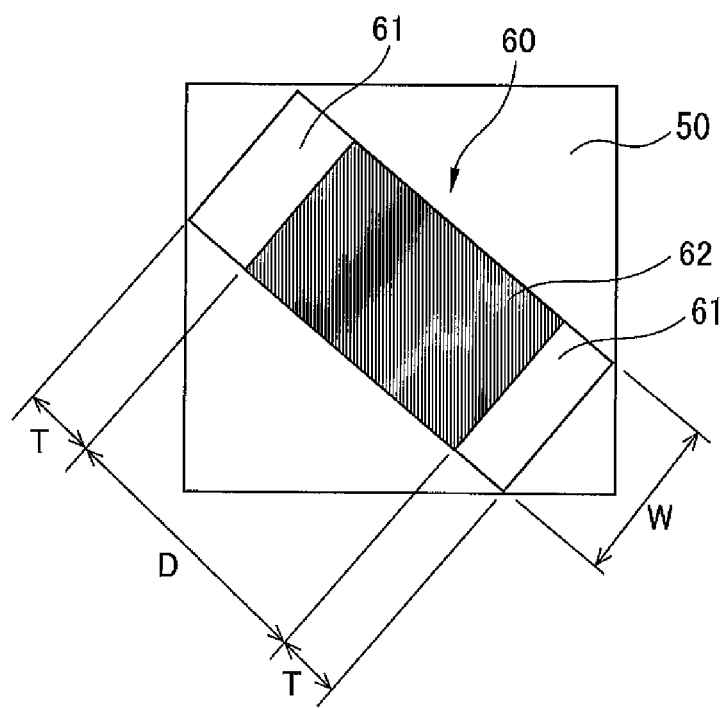
FIG. 15 is a view illustrating one example of a filtering image where a gripper model is projected on an orthogonal projection image.

Step S22 projects (orthogonally projects) the gripper model 20 (FIG. 3A) corresponding to a posture of each grip position posture candidate on the orthogonal projection image 50 to generate a filtering image 60. In the present modified example, according to the changes of the rotation angle ψ, the same number of filtering images 60 as the number of changes of the rotation angle ψ (the number of candidates of ψ) are generated. FIG. 15 is a view illustrating one example of the filtering image 60. In the figure, D is equivalent to a distance between a pair of grip nails 143, and T and W are equivalent to a thickness and a width of the grip nail 143, respectively (refer to FIG. 2). The filtering image 60 includes a substantial image 61 corresponding to the substantial region SP1 of the gripper model 20 and a grip image 62 corresponding to the grip region SP2.

Step S23 calculates a height za of each grip position posture candidate using the filtering image 60. For example, when the filtering image is overlaid on the orthogonal projection image 50 aligning the center of the filtering image 60 and the center of pixels on the orthogonal projection image 50 corresponding to a grip position posture candidate at the same position, a value (Zb−La) can be obtained as a height za of the grip position posture candidate by subtracting the grip depth La (FIG. 2) from a maximum pixel value Zb in the orthogonal projection image 50 included in the grip image 62 at that time.

Step S24 calculates the grip success possibility E corresponding to each grip position posture candidate in the same manner as step S3. In this case, it is judged whether a maximum pixel value in the orthogonal projection image 50 included in the substantial image 61 among the filtering image 60 is larger than the height za of the grip position posture candidate. When the maximum pixel value is larger than za, a lower end of the grip nail 143 collides with the article 17 and therefore, the grip success possibility E is set to be 0. Thereby, the grip success possibility E can be quickly calculated and the presence or absence of interference between the gripper 14 and the article 17 can be determined in a short period of time.

In step S2 of FIG. 4, position posture candidates of the gripper 14 are set using six degrees of freedom of (x, y, z, ϕ, θ, and ψ), but when an opening amount d of the gripper 14, i.e., a distance D between a pair of grip nails 143 is adjustable, grip position posture candidates can also be set using the opening amount d as an additional parameter. In this case, a position posture of the gripper 14 has seven degrees of freedom (x, y, z, ϕ, θ, ψ, and d).

Figure 16:
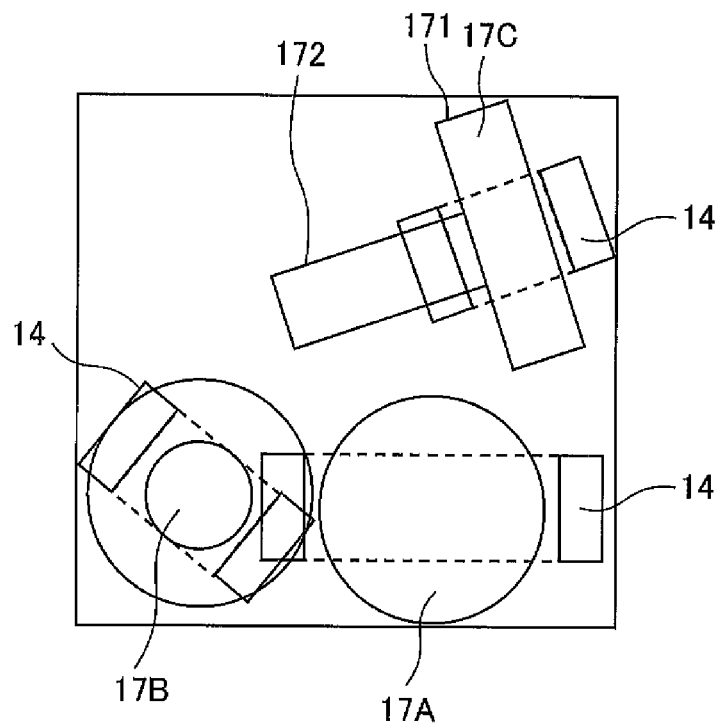
FIG. 16 is a view illustrating various postures of an article and gripper position postures in a container.

FIG. 16 is a plan view illustrating one example of a grip position posture candidate where the opening amount d is set as a parameter. FIG. 16 illustrates three articles 17A, 17B, and 17C with postures different from each other. In other words, the cylindrical portion 172 of the article 17A is directed downward, the cylindrical portion 172 of the article 17B is directed upward, and the cylindrical portion 172 of the article 17C is directed laterally. Regarding the article 17A, when the opening amount d of the gripper 14 is increased, the article 17A can be stably gripped. Further, regarding the articles 17B and 17C, when the opening amount d is decreased, the articles 17B and 17C can be gripped without interference of the grip nail 143 with another article 17. When the opening amount d is set as a parameter, a large number of grip position posture candidates are generated and therefore, it is preferable to set grip position posture candidates using the orthogonal projection image 50 as illustrated in FIG. 14. Thereby, the grip success possibility E can be quickly calculated. In this case, the filtering image 60 is generated by increasing or decreasing a size of the grip image 62 according to the opening amount d. At that time, the number of generated filtering images 60 becomes a candidate number of ψ×a candidate number of the opening amount d.

The present embodiment makes it possible to achieve the following operations and effects.

(1) Surface positions of a plurality of articles 17 randomly piled in a three-dimensional space are measured using the three-dimensional measurement instrument 11 and position information of a plurality of three-dimensional points 31 are acquired (step S1); the gripper model 20 including the substantial region SP1 and the grip region SP2 of the gripper 14 in an opened state is set and at least one position posture candidate is set as a candidate of a position and a posture of the gripper 14 (step S2); based on the position information acquired using the three-dimensional measurement instrument 11 and the gripper model 20, the grip success possibility E of the article 17 in each position posture candidate is calculated, assuming that the gripper 14 is placed at each position posture candidate (step S3); at least one position posture candidate is selected from the position posture candidates based on the grip success possibility E and set as a gripper position posture (step S4); and the robot 12 is controlled to pick up the article 17 by moving the gripper 14 to this gripper position posture (step S7 to step S13). Thereby, the article 17 randomly piled can be picked up by being gripped by the gripper without previously inputting information of the article 17. Since information of the article 17 need not be input, the article 17 can be automatically picked up even regarding a large number of types of articles 17 or an indefinitely shaped article 17.

In contrast, for example, in a method (a method according to a first comparative example) for recognizing a position of an article via three-dimensional pattern matching using a three-dimensional model pattern for the article, the three-dimensional model pattern needs to be prepared and therefore, time and effort are needed. Especially in the case of a large number of types of articles, model patterns for the number of types need to be prepared and therefore, much time and effort are needed. Further, in the method according to the first comparative example, the following problems are produced compared with the present embodiment. It is difficult to prepare a three-dimensional model pattern for an indefinitely shaped article, resulting in difficulty in recognizing a position thereof. In the article 17 randomly piled, it is difficult to acquire three-dimensional points 31 on a side which does not face the three-dimensional measurement instrument 11, and also a large inclination and an obstacle by an adjacent article cause poor photograph conditions. Therefore, it is difficult to obtain three-dimensional point sets sufficient in quality and amount to the extent that a three-dimensional posture of an article can be determined via three-dimensional pattern matching, resulting in possibilities that a recognition failure and a recognition error of a position posture of an article occur, a position of an article to be picked up located upward fails to be recognized, and a position of an article located downward is recognized first. When a position posture of the gripper 14 of the robot 12 is controlled toward an article position posture erroneously recognized or an article position located downward, there are produced possibilities that missing a pickup of the article 17 causes a decrease in operation efficiency of the apparatus and also a collision between the gripper 14 and the article 17 causes damage thereto. When the damage is intended to be avoided, a moving velocity of the robot 12 is forced to decrease, resulting in poor operation efficiency.

Further, for example, in a method (a method according to a second comparative example) for recognizing a position posture of an article using a grip portion region which is a partial region where the article is gripped to set a grip position posture, the user needs to teach a grip portion region of the article previously and therefore, time and effort are needed. Further, the grip portion region is not exposed occasionally on the three-dimensional measurement instrument side depending on a shape and a posture of the article, and in this case, it is difficult to recognize the article, resulting in difficulty in picking up the article. When an article is intended to be recognized regardless of a position posture of the article, a plurality of grip portion regions need to be taught and therefore, much time and effort are needed. Further, in the method according to the second comparative example, it is difficult to teach a grip portion region regarding an indefinitely shaped article, resulting in difficulty in picking up the indefinitely shaped article.

(2) When the grip success possibility E is calculated based on a distance between the center position 40 of the upper surface of the grip region SP2 and the gravity center position 41 of three-dimensional points 31 present in the grip region SP2 (above equation (I)), it is possible to set a position posture capable of deeply gripping the article 17 using a pair of grip nails 143 and also capable of performing a grip in a center portion of the pair of grip nails 143 as a gripper position posture. Therefore, the article 17 can be stably gripped. When the grip success possibility E is calculated based on a distribution, for example, a flatness of three-dimensional points 31 present in the grip region SP2 (above equation (II)), it is possible to grip a portion where the article 17 is more easily gripped.

(3) When the presence or absence of an interference between the substantial region SP1 of the gripper 14 in a grip position posture candidate and the article 17 or the container 16 is judged, and then the grip success possibility E is set to be 0 when the interference occurs, a collision between the gripper 14 and the article 17 or the container 16 becomes avoidable. Therefore, the article 17 can be stably picked up and also damage caused between the gripper 14 and the article 17 or the container 16 becomes preventable.

In contrast, when, for example, a position posture of an article is recognized and a gripper position posture is determined only from the position posture (for example, the method according to the first comparative example), another article interferes with the gripper when moving the gripper to the gripper position posture, resulting in a possibility of failing to grip an article to be gripped. Further, a collision between the gripper and the article or the container may cause breakage of the gripper, the article, and the container.

(4) When a grip position posture candidate of the gripper 14 is set and the grip success possibility E is calculated on an image 50 where three-dimensional points 31 and a gripper model 20 are projected (FIG. 13), a gripper position posture can be quickly set. In this case, processing is executed using the image 50 where three-dimensional points 31 are orthogonally projected and the filtering image 60 where the gripper model 20 each are orthogonally projected and therefore, the following advantages are also created. On a distance image having a common viewpoint, a distance between pixels next to each other on a real space is not constant. In other words, as a target on the real space is distant from the view point, the target appears on the pixel by being reduced. Therefore, it is difficult to deal with a size of the gripper 14 on the real space based on a distance between pixels and therefore, it is necessary to express a gripper model using a size on a distance image. However, when a size of the gripper 14 is expressed on the distance image, poor accuracy is obtained, resulting in difficulty in setting a gripper position posture. In contrast, when the orthogonal projection image 50 is used, a distance between pixels next to each other becomes, as such, a distance on the real space and then a unit of the real space is directly usable for setting the gripper model 20 and therefore, the gripper position posture is easily set.

(5) If an opening amount of the gripper 14 is adjustable, a grip position posture candidate is set using an opening amount d of the gripper 14 when causing the gripper 14 to approach the article 17 as a parameter, and therefore a gripper position posture where the opening amount d of the gripper 14 is optimized according to a loading state of the article 17 can be determined. Thereby, the article 17 can be assuredly picked up without interference between the gripper 14 and an article 17 other than an article 17 to be picked up (targeted article).

An article pickup method for picking up an article randomly piled in a three-dimensional space using the robot 12 including the gripper 14 provided in an openable and closable manner may be configured in any manner, as long as the method includes: measuring surface positions of a plurality of articles 17 using the three-dimensional measurement instrument 11 to acquire position information of a plurality of three-dimensional points 31; setting a gripper model 20 including the substantial region SP1 which is a region of a substantial portion of the gripper 14 in an opened state and the grip region SP2 inside the substantial region SP1; setting at least one position posture candidate as a candidate of a position and a posture of the gripper 14; calculating the grip success possibility E of the article 17 by the gripper 14 in each position posture candidate, assuming that the gripper 14 is placed at the position posture candidates, based on the position information acquired by the three-dimensional measurement instrument 11 and the gripper model 20; selecting at least one position posture candidate selected from the position posture candidates based on the grip success possibility E and set the selected position posture candidate as a gripper position posture; and controlling the robot 12 so as to move the gripper 14 to the set gripper position posture to pick up any of the articles 17.

Figure 17:
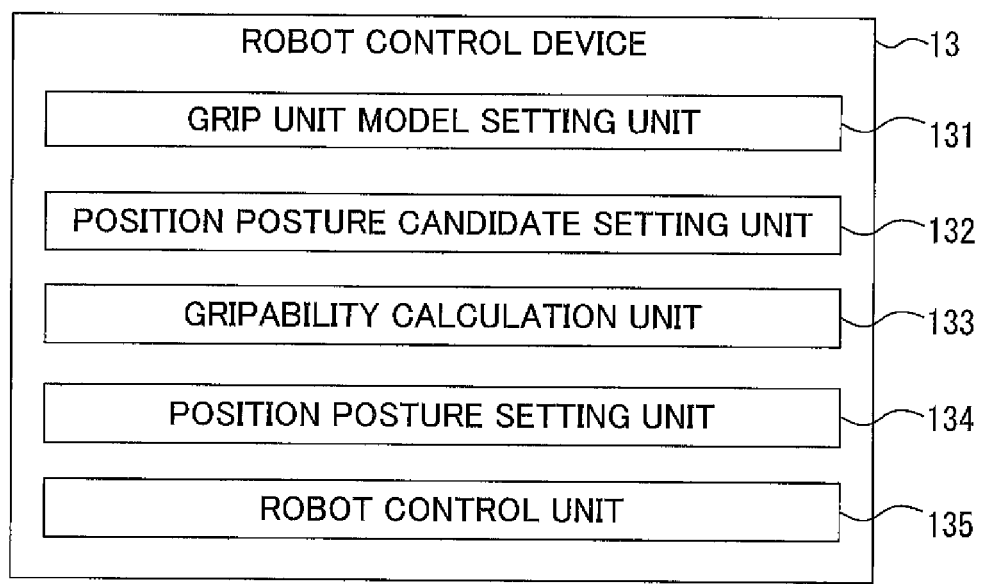
FIG. 17 is a block diagram illustrating an internal configuration of the robot control device of FIG. 1.

FIG. 17 is a block diagram illustrating an internal configuration of the robot control device 13 of FIG. 1. The robot control device 13 includes a grip unit model setting unit 131, a position posture candidate setting unit 132, a gripability calculation unit 133, a position posture setting unit 134, and a robot control unit 135.

In the above embodiment, the gripper 14 including a pair of grip nails (two fingers) grips the article 17, but the gripper 14 may include at least three fingers and a configuration of the grip unit provide in an openable and closable manner for gripping the article 17 is not limited to the configuration described above. Therefore, a configuration of the grip unit model setting unit 131 for setting a grip unit model including a substantial region which is a region of a substantial portion of the grip unit in an opened state and a grip region inside the substantial region is not limited to the configuration described above.

In the embodiment, a position posture candidate of the gripper 14 is set (step S2) by using at least one degree of freedom among degrees of freedom in six directions (x, y, z, φ, θ, and ψ), as a parameter or an opening amount d of the gripper 14 as a parameter, but a configuration of the position posture candidate setting unit 132 for setting at least one position posture candidate as a candidate of a position and a posture of the grip unit is not limited to the configuration described above.

For example, it is possible that a connected set calculation unit included in the robot control device 13 determines at least one connected set made by connecting three-dimensional points 31 present in the vicinity of each other from a plurality of three-dimensional points 31 measured using the three-dimensional measurement instrument 11 to set a position posture candidate of the gripper 14 based on each connected set. When, for example, a distance between a first three-dimensional point 31 and a second three-dimensional point 31 next to each other falls within a predetermined value, the connected set is configured by connecting the first three-dimensional point 31 and the second three-dimensional point 31 with each other.

Figure 18:
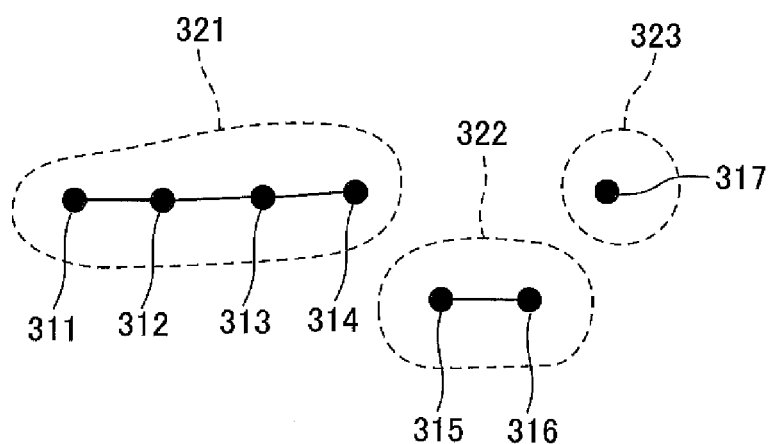
FIG. 18 is a view illustrating one example of a connected set.

FIG. 18 is a view illustrating one example of a connected set 32. When as illustrated in FIG. 18, a plurality of three-dimensional points 31 (expressed by 311 to 317) are measured using the three-dimensional measurement instrument 11 and of these, 311 and 312, 312 and 313, 313 and 314, and 315 and 316 are present within a predetermined distance, respectively, these points are connected with each other. In this case, 311 and 314 are also connected via 312 and 313 and therefore, 311 to 314 configure the same connected set 321. On the other hand, 315 and 316 are not connected with any one of 311 to 314 and therefore, configure another connected set 322. Since 371 is not connected to any one of 311 to 316, 317 singly configures a connected set 323.

When surfaces of articles 17 randomly piled are measured using the three-dimensional measurement instrument 11, three-dimensional points 31 (for example, 313 and 314 of FIG. 18) next to each other on the same article 17 are located close to each other. In contrast, in a boundary of articles 17, positions of three-dimensional points (for example, 314 and 315 of FIG. 18) next to each other are largely changed. Therefore, while the three-dimensional points 313 and 314 belong to the same connected set 32, the three-dimensional points 314 and 315 belong to connected sets 32 different from each other. Therefore, when a maximum distance between three-dimensional points configuring a connected set 32, a minimum number of points and a maximum number of points in the connected set 32, and others are appropriately set, the connected set 32 can be considered a surface shape of a single article 17.

When a grip position posture candidate of the gripper 14 is set based on the connected set 32, for example, a gravity center position of three-dimensional points 31 configuring each connected set 32 is set as a grip position candidate of the grip position posture candidate. Then, in this grip position candidate, a posture is changed or in the grip position candidate, predetermined postures are combined to set the grip position posture candidate. It is possible to set a grip position posture candidate in a predetermined range (search range) around a gravity center position of the connected set 32 or to set a grip position posture candidate using a region where three-dimensional points 31 configuring the connected set 32 exist as the search range.

In the above-described embodiment, the grip success possibility E of the article 17 in each grip position posture candidate when the gripper 14 is placed in the grip position posture candidates is calculated, using the predetermined calculation equations (equation (I) and equation (II)), based on position information of three-dimensional points 31 acquired using the three-dimensional measurement instrument 11 and a gripper model 20 (a grip unit model), but the configuration of the gripability calculation unit 133 is not limited thereto. It is judged whether the article 17 is present in the substantial region SP1 of the gripper model 20 and then the grip success possibility E in a grip position posture candidate where the article 17 is judged to exist is set to be 0, but the grip success possibility E may be decreased to the extent of being unequal to 0.

In the above-described embodiment, it is judged whether the substantial region SP3 of the container model 161 is present in the substantial region SP1 of the gripper 14, and when the substantial region SP3 is present, the grip success possibility E is set to be 0, but the grip success possibility E may be decreased to the extent of being unequal to 0. Various shapes are employable for the container 16 (storage unit), and the robot control device 13 functioning as a storage unit model setting unit for setting a storage unit model which is a model of the storage unit may be configured in any manner.

In the above-described embodiment (FIG. 13), an orthogonal projection image 50 obtained by orthogonally projecting a plurality of three-dimensional points 31 measured using the three-dimensional measurement instrument 11 is generated, a position posture candidate is set on the orthogonal projection image 50, and the grip success possibility E is calculated based on this position posture candidate and a filtering image 60 orthogonally projected on the orthogonal projection image 50. However, it is possible to project three-dimensional points 31 on an image using a method other than orthogonal projection. In other words, as long as a position posture candidate is set based on projected points obtained by projecting three-dimensional points 31 on a plane and then the grip success possibility E is calculated based on a projection model such as the filtering image 60 obtained by projecting a grip unit model such as the gripper model 20 on the plane and the projected points, various modifications may be made for this embodiment.

In the above-described embodiment, a grip position posture candidate where the grip success possibility E calculated in the gripability calculation unit 133 is maximized or locally maximized is set as a gripper position posture. However, as long as at least one position posture candidate is selected from position posture candidates set by the position posture candidate setting unit 132 based on the grip success possibility E calculated in the gripability calculation unit 133 and then the selected position posture candidate is set as a grip unit position posture, the position posture setting unit 134 may be configured in any manner.

In the above-described embodiment, the gripper position posture is expressed using the arrows A1 and A2 (FIG. 9) and the gripper 14 is moved to this gripper position posture. However, as long as the robot 12 is controlled so as to move the gripper 14 to a gripper position posture (a grip unit position posture) set by the position posture setting unit 134 to pick up the article 17, the robot control unit 135 may be configured in any manner.

It is possible to arbitrarily combine the embodiment with one modified example or a plurality of modified examples.

According to the present invention, position posture candidates of the grip unit are set, grip success possibilities of an article in the position posture candidates are calculated, and one or more position posture candidates are selected from the position posture candidates based on the grip success possibilities and are set as a grip unit position posture. Therefore, information of an article need not be input and the article can be easily gripped regardless of a shape and a posture of the article.

The present invention has been described in association with the preferred embodiment, but it should be understood by those skilled in the art that various modifications and conversions may be made without departing from the disclosed scope of the claims to be described later.

The invention claimed is:

1. An article pickup apparatus, comprising:
a robot including a grip unit provided in an openable and closable manner;
a three-dimensional measurement instrument measuring surface positions of a plurality of articles randomly piled on a three-dimensional space to acquire position information of a plurality of three-dimensional points;
a grip unit model setting unit setting a grip unit model including a substantial region and a grip region inside the substantial region, the substantial region being a region of a substantial portion of the grip unit in an opened state;
a position posture candidate setting unit setting one or more position posture candidates as a candidate of a position and a posture of the grip unit;
a gripability calculation unit calculating a grip success possibility of any of the articles by the grip unit in each of the grip position posture candidates, assuming that the grip unit is placed at the grip position posture candidates set by the position posture candidate setting unit, based on the position information acquired by the three-dimensional measurement instrument and the grip unit model set by the grip unit model setting unit and based on the position information of the three-dimensional points present in the grip region among the position information acquired by the three-dimensional measurement instrument;
a position posture setting unit selecting one or more position posture candidates from the position posture candidates set by the position posture candidate setting unit, based on the grip success possibility calculated by the gripability calculation unit, and setting the selected one or more position posture candidates as one or more grip unit position postures; and
a robot control unit controlling the robot so as to move the grip unit to the one or more grip unit position postures set by the position posture setting unit to pick up any of the articles.

2. The article pickup apparatus according to claim 1, wherein
the gripability calculation unit calculates the grip success possibility based on a gravity center position of the three-dimensional points present in the grip region.

3. The article pickup apparatus according to claim 1, wherein
the position posture candidate setting unit sets the position posture candidates using one or more degrees of freedom, among six degrees of freedom, as a parameter, and
the six degrees of freedom include three translational degrees of freedom and three rotational degrees of freedom to define the position and the posture of the grip unit.

4. The article pickup apparatus according to claim 3, wherein
the position posture candidate setting unit sets the position posture candidates using an opening amount of the grip unit as a parameter.

5. The article pickup apparatus according to claim 1, further comprising:
a connected set calculation unit obtaining a connected set made by connecting the three-dimensional points present in the vicinity of each other among the plurality of three-dimensional points measured by the three-dimensional measurement instrument, wherein the position posture candidate setting unit sets the position posture candidates based on the connected set obtained by the connected set calculation unit.

6. The article pickup apparatus according to claim 1, wherein
the position posture candidate setting unit sets the position posture candidates based on projected points obtained by projecting the plurality of three-dimensional points measured by the three-dimensional measurement instrument on a plane, and
the gripability calculation unit calculates the grip success possibility based on a projection model obtained by projecting the grip unit model set by the grip unit model setting unit on the plane and the projected points.

7. The article pickup apparatus according to claim 1, wherein the gripability calculation unit
judges whether any of the articles is present in the substantial region of the grip unit model, for each of the position posture candidates set by the position posture candidate setting unit, based on the position information acquired by the three-dimensional measurement instrument and the grip unit model set by the grip unit model setting unit, and
decreases the grip success possibility or sets the grip success possibility to be zero, in a position posture candidate judged that the article is present.

8. The article pickup apparatus according to claim 1, further comprising a storage unit model setting unit setting a storage unit model, the storage unit model being a model of a storage unit storing the plurality of articles,
wherein the gripability calculation unit
judges whether the storage unit model is present in the substantial region of the grip unit model, for each of the position posture candidates set by the position posture candidate setting unit, based on the storage unit model acquired by the storage unit model setting unit and the grip unit model set by the grip unit model setting unit, and
decreases the grip success possibility or sets the grip success possibility to be zero, in a position posture candidate judged that the storage unit model is present.

9. The article pickup apparatus according to claim 1, wherein
the position posture setting unit selects a grip position posture candidate where the grip success possibility calculated by the gripability calculation unit is maximized, from the position posture candidates set by the position posture candidate setting unit, and sets the selected grip position posture candidate as the grip unit position posture.

10. The article pickup apparatus according to claim 1, wherein
the position posture setting unit selects a grip position posture candidate where the grip success possibility calculated by the gripability calculation unit is locally maximized, from the position posture candidates set by the position posture candidate setting unit, and sets the selected grip position posture candidate as the grip unit position posture.

11. An article pickup method for picking up any of articles randomly piled on a three-dimensional space using a robot including a grip unit provided in an openable and closable manner, the method comprising:
measuring surface positions of a plurality of the articles using a three-dimensional measurement instrument to acquire position information of a plurality of three-dimensional points;
setting a grip unit model including a substantial region and a grip region inside the substantial region, the substantial region being a region of a substantial portion of the grip unit in an opened state;
setting one or more position posture candidates as a candidate of a position and a posture of the grip unit;
calculating a grip success possibility of any of the articles by the grip unit in each of the grip position posture candidates, assuming that the grip unit is placed at the grip position posture candidates, based on the position information acquired by the three-dimensional measurement instrument and the grip unit model and based on the position information of the three-dimensional points present in the grip region among the position information acquired by the three-dimensional measurement instrument;
selecting one or more position posture candidates from the position posture candidates based on the grip success possibility, and setting the selected one or more position posture candidates as one or more grip unit position postures; and
controlling the robot so as to move the grip unit to the one or more grip unit position postures to pick up any of the articles.

* * * * *